(12) United States Patent
He et al.

(10) Patent No.: US 11,051,270 B2
(45) Date of Patent: Jun. 29, 2021

(54) SINGLE LAMP LOCALIZATION SYSTEM AND METHOD

(71) Applicant: Regents of the University of Minnesota, Minneapolis, MN (US)

(72) Inventors: Tian He, Arden Hills, MN (US); Song Liu, Minneapolis, MN (US)

(73) Assignee: Regents of the University of Minnesota, Minneapolis, MN (US)

(*) Notice: Subject to any disclaimer, the term of this patent is extended or adjusted under 35 U.S.C. 154(b) by 54 days.

(21) Appl. No.: 16/179,649

(22) Filed: Nov. 2, 2018

(65) Prior Publication Data

US 2019/0141660 A1 May 9, 2019

Related U.S. Application Data

(60) Provisional application No. 62/581,329, filed on Nov. 3, 2017.

(51) Int. Cl.
| | |
|---|---|
| *H04W 64/00* | (2009.01) |
| *H04B 10/50* | (2013.01) |
| *H04B 10/556* | (2013.01) |
| *G01J 1/42* | (2006.01) |
| *G01J 1/04* | (2006.01) |
| *H04Q 11/00* | (2006.01) |
| *G01S 1/00* | (2006.01) |

(Continued)

(52) U.S. Cl.
CPC .......... *H04W 64/00* (2013.01); *G01J 1/0266* (2013.01); *G01J 1/0411* (2013.01); *G01J 1/42* (2013.01); *G01S 1/00* (2013.01); *H04B 10/116* (2013.01); *H04B 10/502* (2013.01); *H04B 10/5563* (2013.01); *H04Q 11/0005* (2013.01); *G01J 2001/4252* (2013.01)

(58) Field of Classification Search
CPC .... G01J 1/0411; G01J 1/42; G01J 2001/4252; G01J 1/0266; H04B 10/502; H04B 10/5563; H04B 10/116; H04Q 11/0005; H04W 64/00; G01S 1/00; G01S 1/7032; G01S 1/7038; G01S 5/0036; G01S 5/16
USPC .................................................. 356/614–624
See application file for complete search history.

(56) References Cited

U.S. PATENT DOCUMENTS

| | | | | |
|---|---|---|---|---|
| 4,429,299 A | * | 1/1984 | Kabat | .................... G08B 19/00 340/10.1 |
| 8,866,391 B2 | | 10/2014 | Ganick et al. | |

(Continued)

OTHER PUBLICATIONS

Liu et al., "SmartLight: Light-weight 3D Indoor Localization Using a Single LED Lamp," SenSys '17: Proceedings of the 15th ACM Conference on Embedded Network Sensor Systems, Article 11, Nov. 2017, 14 pp.

(Continued)

*Primary Examiner* — Tri T Ton
(74) *Attorney, Agent, or Firm* — Shumaker & Sieffert, P.A.

(57) ABSTRACT

A 3D digital indoor localization system uses light emitting diode (LED) lighting infrastructures for localization. In one example approach, a light source includes a convex lens and an array of LEDs, all configured as a single LED lamp. The localization system exploits the light splitting properties of the convex lens to create a one-to-one mapping between a location and the set of orthogonal digital light signals received from particular LEDs of the LED lamp.

19 Claims, 11 Drawing Sheets

(51) Int. Cl.
  *H04B 10/116* (2013.01)
  *G01J 1/02* (2006.01)

(56) References Cited

U.S. PATENT DOCUMENTS

| | | | | |
|---|---|---|---|---|
| 2005/0264472 | A1* | 12/2005 | Rast | G09G 3/14 345/30 |
| 2006/0239605 | A1* | 10/2006 | Palen | G02B 6/423 385/14 |
| 2008/0259356 | A1* | 10/2008 | Lechuga Gomez | G01Q 20/02 356/622 |
| 2013/0286846 | A1 | 10/2013 | Atlas et al. | |

OTHER PUBLICATIONS

Abrudan et al., "Distortion Rejecting Magneto-Inductive 3-D Localization (MagLoc)," IEEE Journal on Selected Areas in Communications, vol. 33, No. 11, May 2015, 2404-2417.

Abrudan et al., "Impact of Rocks and Minerals on Underground Magneto-Inductive Communication and Localization," IEEE Access, vol. 4, Aug. 2016, pp. 3999-4010.

Adams, "First Look at the Huge 440 LED Dense Matrix Array for the Kessil A2000," accessed from https://reefbuilders.com/2016/04/28/this-is-what-kessils-huge-440-led-multichip-dense-matrix-array-for-the-a2000-looks-like/, Apr. 2016, 4 pp.

Azizyan et al., "SurroundSense: Mobile Phone Localization via Ambience Fingerprinting," Proceedings of the 15th Annual International Conference on Mobile Computing and Networking (MobiCom'09), Beijing, China, Sep. 2009, ACM, 261-272.

Azzouzi et al., "New Measurement Results for the Localization of UHF RFID Transponders Using an Angle of Arrival (AoA) Approach)," 2011 IEEE International Conference on RFID, Orlando, Florida, USA, IEEE, Apr. 2011, 91-97.

Bahl et al., "RADAR: An In-Building RF-based User Location and Tracking System," Proceedings IEEE INFOCOM 2000. The Conference on Computer Communications. 19th Annual Joint Conference of the IEEE Computer and Communications Societies, vol. 2, Tel Aviv, Israel, Mar. 2000, 775-784.

Chen et al., "FM-based Indoor Localization," Proceedings of the 10th International Conference on Mobile Systems, Applications, and Services (MobiSys'12), Low Wood Bay, Lake District, United Kingdom, ACM, Jun. 2012, 169-182.

Cheng et al., "Time-Bounded Essential Localization for Wireless Sensor Networks," IEEE/ACM Transactions on Networking (TON), vol. 21, No. 2, Apr. 2013, 400-412.

Chintalapudi et al., "Indoor Localization Without the Pain," Proceedings of the 16th Annual International Conference on Mobile Computing and Networking (MobiCom'10), Chicago, Illinois, USA, ACM, Sep. 2010, 173-184.

Cho et al., "Inferring Mobile Trajectories using a Network of Binary Proximity Sensors," 2011 8th Annual IEEE Communications Society Conference on Sensor, Mesh and Ad Hoc Communications and Networks (SECON), Salt Lake City, Utah, USA, Jun. 2011, 188-196.

Ding et al., "Fault Tolerant Target Tracking in Sensor Networks," Proceedings of the 10th ACM International Symposium on Mobile Ad Hoc Networking and Computing (MobiHoc'09), New Orleans, Louisiana, USA, May 2019, 125-134.

Fang et al., "BodyScan: Enabling Radio-based Sensing on Wearable Devices for Contactless Activity and Vital Sign Monitoring," Proceedings of the 14th Annual International Conference on Mobile Systems, Applications, and Services (MobiSys'16), Singapore, Singapore, ACM, Jun. 2016, 97-110.

Fang et al., "HeadScan: A Wearable System for Radio-based Sensing of Head and Mouth-related Activities," Proceedings of the 15th International Conference on Information Processing in Sensor Networks (ISPN'16), Vienna, Austria, IEEE Press, vol. 21, Apr. 2016, 12 pp.

Gomez et al., "Beyond 100-Gb/s Indoor Wide Field-of-View Optical Wireless Communications," IEEE Photonics Technology Letters, vol. 27, No. 4, Feb. 2015, 367-370.

Goswami et al., "WiGEM: A Learning-Based Approach for Indoor Localization," Proceedings of the 7th Conference on Emerging Networking Experiments and Technologies (CoNEXT'11), Tokyo, Japan, ACM, Dec. 2011, 12 pp.

Gwon et al., "Error Characteristics and Calibration-free Techniques for Wireless LAN-based Location Estimation," Proceedings of the 2nd International Workshop on Mobility Management & Wireless Access Protocols (MobiWac'04), Philadelphia, Pennsylvania, USA, ACM, Oct. 2004, 2-9.

He et al., "Range-Free Localization Schemes for Large Scale Sensor Networks," Proceedings of the 9th Annual International Conference on Mobile Computing and Networking, ACM, Sep. 2003, 15 pp.

Khalil et al., "Nonintrusive Occupant Identification by Sensing Body Shape and Movement," Proceedings of the 3rd ACM International Conference on Systems for Energy-Efficient Built Environments, ACM, Nov. 2016, 10 pp.

Kuo et al., "Luxapose: Indoor Positioning with Mobile Phones and Visible Light," Proceedings of the 20th Annual International Conference on Mobile Computing and Networking. ACM, Sep. 2014, 12 pp.

Kusy et al., "Node-Density Independent Localization," Proceedings of the 5th International Conference on Information Processing in Sensor Networks, ACM, Apr. 2006, 8 pp.

Lane et al., "Ambient Beacon Localization: Using Sensed Characteristics of the Physical World to Localize Mobile Sensors," Proceedings of the 4th Workshop on Embedded Networked Sensors, ACM, Jun. 2007, 5 pp.

Lazik et al., "ALPS: A Bluetooth and Ultrasound Platform for Mapping and Localization," Proceedings of the 13th ACM Conference on Embedded Networked Sensor Systems, ACM, Nov. 2015, 12 pp.

Lazik et al., "Indoor Pseudo-ranging of Mobile Devices Using Ultrasonic Chirps," Proceedings of the 10th ACM Conference on Embedded Network Sensor Systems, ACM, Nov. 2012, 14 pp.

Li et al., "Epsilon: A Visible Light Based Positioning System," 11th USENIX Symposium on Networked Systems Design and Implementation, (NSDI 14), Apr. 2014, 14 pp.

Li et al., "Human Sensing Using Visible Light Communication," Proceedings of the 21st Annual International Conference on Mobile Computing and Networking, ACM, Sep. 2015, 14 pp.

Li et al., "Practical Human Sensing in the Light," The 14th ACM International Conference on Mobile Systems, Applications, and Services, Jun. 2016, 14 pp.

Lim et al., "Zero-Configuration Indoor Localization over IEEE 802.11 Wireless Infrastructure," Wireless Networks, vol. 16, No. 2, Feb. 2010, 405-420.

Lim et al., "Zero-Configuration, Robust Indoor Localization: Theory and Experimentation," Proceedings IEEE INFOCOM 2006. 25th IEEE International Conference on Computer Communications, Barcelona, Spain, Apr. 2006, 13 pp.

Liu et al., "Adaptive Sampling of RF Fingerprints for Fine-grained Indoor Localization," IEEE Transactions on Mobile Computing, vol. 15, No. 10, Dec. 2015, 16 pp.

Liu et al., "Distributed Group Management in Sensor Networks: Algorithms and Applications to Localization and Tracking," Telecommunication Systems, vol. 26, No. 2, Jun. 2004, 24 pp.

Markham et al., "Revealing the Hidden Lives of Underground Animals using Magneto-inductive Tracking," Proceedings of the 8th ACM Conference on Embedded Networked Sensor Systems, ACM, Nov. 2010, 14 pp.

Mietz et al., "Work in Progress: Resource-Aware Fault Localization in Large Sensor Networks," Distributed Computing in Sensor Systems (DCOSS), 2012 IEEE 8th International Conference on IEEE, May 2012, 4 pp.

Mirshekari et al., "Characterizing Wave Propagation to Improve Indoor Step-Level Person Localization Using Floor Vibration," SPIE Smart Structures and Materials+Nondestructive Evaluation and Health Monitoring, International Society for Optics and Photonics, Apr. 2016, 11 pp.

(56) References Cited

OTHER PUBLICATIONS

Mirshekari et al., "Step-Level Person Localization Through Sparse Sensing of Structural Vibration," Proceedings of the 14th International Conference on Information Processing in Sensor Networks, ACM, Apr. 2015, 2 pp.
Nirjon et al., "COIN-GPS: Indoor Localization from Direct GPS Receiving," Proceedings of the 12th Annual International Conference on Mobile Systems, Applications, and Services ACM, Jun. 2014, 14 pp.
Parnandi et al., "Coarse In-Building Localization and Smartphones," International Conference on Mobile Computing, Applications, and Services, Springer, Oct. 2009, 12 pp.
Patwari et al., "Chapter V Calibration and Measurement of Signal Strength for Sensor Localization," Localization Algorithms and Strategies for Wireless Sensor Networks: Monitoring and Surveillance Techniques for Target Tracking, IGI Global, Jan. 2009, 24 pp.
Patwari et al., "Learning Sensor Location from Signal Strength and Connectivity," Secure Localization and Time Synchronization for Wireless Sensor and Ad Ho Networks, Springer, Jan. 2007, 26 pp.
Patwari et al., "Locating the Nodes: Cooperative Localization in Wireless Sensor Networks," IEEE Signal Processing Magazine, vol. 55, Jul. 2005, 16 pp.
Patwari et al., "Using Proximity and Quantized RSS for Senor Localization in Wireless Networks," Proceedings of the 2nd ACM International Conference on Wireless Sensor Networks and Applications, ACM, Sep. 2003, 10 pp.
Prince et al., "A Two Phase Hybrid RSS/AoA Algorithm for Indoor Device Localization using Visible Light," Global Communications Conference (GLOBECOM), 2012 IEEE, IEEE, Sep. 2012, 16 pp.
Rai et al., "Zee: Zero-Effort Crowdsourcing for Indoor Localization," Proceedings of the 18th Annual International Conference on Mobile Computing and Networking, ACM, Aug. 2012, 12 pp.
Rajagopal et al., "Visual Light Landmarks for Mobile Devices," Proceedings of the 13th International Symposium on Information Processing in Sensor Networks, IEEE Press, Apr. 2014, 12 pp.
Romer, "Tracking Real-World Phenomena With Smart Dust," European Workshop on Wireless Sensor Networks, Springer, Jan. 2004, 16 pp.
Shih et al., "AURES: A Wide-Band Ultrasonic Occupancy Sensing Platform," Proceedings of the 3rd ACM International Conference on Systems for Energy-Efficient Built Environments, ACM, Nov. 2016, 10 pp.
Shih et al., "Occupancy Estimation Using Ultrasonic Chirps," Proceedings of the ACM/IEEE Sixth International Conference on Cyber-Physical Systems, ACM, Apr. 2015, 10 pp.
Stoleru et al., "A High-Accuracy, Low-Cost Localization System for Wireless Sensor Networks," Proceedings of the 3rd International Conference on Embedded Networked Sensor Systems, ACM, Nov. 2005, 14 pp.
Stoleru et al., "StarDust: A Flexible Architecture for Passive Localization in Wireless Sensor Networks," Proceedings of the 4th International Conference on Embedded Networked Sensor Systems, ACM, Nov. 2006, 14 pp.
Sun et al., "Polaris: Getting Accurate Indoor Orientations for Mobile Devices Using Ubiquitous Visual Patterns on Ceilings," Proceedings of the 12th Workshop on Mobile Computing Systems and Applications, ACM, Feb. 2012, 6 pp.
Wagner et al., "Passive RFID Tomographic Imaging for Device-Free User Localization," Positioning Navigation and Communication (WPNC), 2012 9th Workshop on IEEE, Mar. 2012, 6 pp.
Wang et al., "Dude, Where's My Card? RFID Positioning That Works with Multipath and Non-Line Sight," ACM SIGCOMM Computer Communication Review, vol. 43, No. 4, Aug. 2013, 12 pp.
Wang et al., "LiFS: Low Human-Effort, Device-Free Localization with Fine-Grained Subcarrier Information," Proceedings of the 22nd Annual International Conference on Mobile Computing and Networking, ACM, Oct. 2016, 14 pp.
Whitehouse et al., "Sensor Field Localization: A Deployment and Empirical Analysis," UC Berkeley Technical Report, UCB/CSD-04-1349, Apr. 2004, 12 pp.
Xie et al., "Quantitative Uncertainty-Based Incremental Localization and Anchor Selection in wireless Sensor Networks," Proceedings of the 14th ACM International Conference on Modeling, Analysis and Simulation of Wireless and Mobile Systems, ACM, Oct. 2011, 10 pp.
Xie et al., "SpinLight: A High Accuracy and Robust Light Positioning System for Indoor Applications," Proceedings of the 13th ACM Conference on Embedded Networked Sensor Systems, ACM, Nov. 2015, 13 pp.
Xiong et al., "ArrayTrack: A Fine-Grained Indoor Location System," Presented as part of the 10th USENIX Symposium on Networked Systems Design and Implementation (NSDI 13), Apr. 2013, 14 pp.
Yang et al., "Cooperative Target Localization Method for Heterogeneous Sensor Networks," Networking and Mobile Computing, Aug. 2005, 10 pp.
Yang et al., "Indoor Three-dimensional Location Estimation Based on LED Visible Light Communication," Electronic Letters, vol. 49, No. 1, Jan. 2013, 2 pp.
Yang et al., "Tagoram: Real-Time Tracking of Mobile RFID Tags to High Precision Using COTS Devices," Proceedings of the 20th Annual International Conference on Mobile Computing and Networking, ACM, Sep. 2014, 12 pp.
Yoshino et al., "High-accuracy Positioning System Using Visible LED Lights and Image Sensor," 2008 IEEE Radio and Wireless Symposium; Jan. 2008, 4 pp.
Youssef et al., "The Horus WLAN Location Determination System," Proceedings of the 3rd International Conference on Mobile Systems, Applications, and Services, ACM, Jun. 2005, 14 pp.
Zhang et al., "LOCALE: Collaborative Localization Estimation for Sparse Mobile Sensor Networks," Proceedings of the 7th International Conference on Information Processing in Sensor Networks, IEEE Computer Society, Apr. 2008, 12 pp.
Zhang et al., "NaviGlass: Indoor Localisation Using Smart Glasses," International Conference on Embedded Wireless Systems and Networks (EWSN) Feb. 2016, 12 pp.
Zhang et al., "WiFi-ID: Human Identification using WiFi Signal," Distributed Computing in Sensor Systems (DOSS), 2016 International Conference on IEEE, May 2016, 8 pp.
Zhao et al., "Localization of Wireless Sensor Networks int he Wild: Pursuit of Ranging Quality," IEEE/ACM Transactions on Networking, vol. 21, No. 1, Feb. 2013, 14 pp.
Zhou et al., "Indoor Positioning Algorithm Using Light-Emitting Diode Visible Light Communications," Optical Engineering, vol. 51, No. 8, Aug. 2012, 6 pp.

\* cited by examiner

SINGLE LAMP LOCALIZATION SYSTEM AND METHOD

This application claims the benefit of U.S. Provisional Patent Application No. 62/581,329 filed Nov. 3, 2017, the entire content being incorporated herein by reference.

GOVERNMENT INTEREST

This invention was made with government support under CNS-1525235 awarded by National Science Foundation. The government has certain rights in the invention.

BACKGROUND

Many existing indoor localization systems have achieved applaudable performance through comprehensive modeling of their envisioned working scenarios. However, their real-life deployment is often prohibited by high deployment overhead and performance degradation in dynamic environments.

SUMMARY

A 3D digital indoor localization system uses light emitting diode (LED) lighting infrastructures for localization by placing the design complexity in the light source while simplifying the receiver. Such an approach eases system deployment and calibration. In one example approach, the light source includes a convex lens and an array of LEDs, all configured as a single LED lamp. The localization system exploits the light splitting properties of the convex lens to create a one-to-one mapping between a location and the set of orthogonal digital light signals received from particular LEDs of the LED lamp. In one example approach, a user places a plurality of receivers throughout a room and illuminates the receivers using the LED lamp. The user then uses the output from each receiver to locate the respective receiver within the room as a function of the LEDs that illuminated the receiver.

In one example, a lamp includes a plurality of light emitting diodes (LEDs) arranged as an array of LEDs, a convex lens and a modulation distribution network, wherein the modulation distribution network receives a set of modulation signals and modulates light emitted by each LED with a modulation signal selected from the set of modulation signals to form digital light signals associated with each respective LED, wherein the convex lens is positioned to create a one-to-one mapping between a location and the digital light signals received from particular LEDs.

In another example, a localization system comprises a plurality of receivers; and an LED lamp, wherein the LED lamp includes a plurality of light emitting diodes (LEDs) arranged as an array of LEDs; a convex lens; and a modulation distribution network, wherein the modulation distribution network receives a set of modulation signals and modulates light emitted by each LED with a modulation signal selected from the set of modulation signals to form digital light signals associated with each respective LED, and wherein the convex lens is positioned to create a one-to-one mapping between a location and the digital light signals received from particular LEDs.

In yet another example, a method comprises modulating each light emitting diode (LED) in an LED lamp having an N×M array of LEDs with a modulation signal, wherein N and M are integers; determining, within a receiver having a light sensor $S_i$, frequency components $F_i$ in light received by the light sensor; constructing an N×M bitmap array associated with the receiver, wherein each pixel in the bitmap array is associated with an LED in the LED lamp and wherein constructing includes indicating, in the bitmap array, if a modulation signal associated with an LED is detected in a location associated with a pixel in the bitmap array; forming two or more one-dimensional projection vectors associated with the bitmap array, wherein each projection vector has an associated projection direction; determining, based on the projection vectors and on the projection direction of each projection vector, an area of activity on the bitmap array associated with light received from the LED lamp; and determining the receiver's location as a function of where the area of activity is located on the bitmap array.

DETAILED DESCRIPTION

Most existing localization systems are analog-based; their accuracy depends on the calibration of the model parameters and measurements of analog metrics such as time of flight (TOF), angles of arrival (AOA) and received signal strength (RSS). Some systems utilize the received RF signal strength for distance measurement, coupling with multilateration (MLAT) for localization. Analog-based approaches can achieve high accuracy with careful calibration in a static environment. However, they suffer performance degradation in dynamic environments where the cost of calibration is prohibitive.

It is known that analog approaches rely heavily on 1) the accuracy of model parameters, 2) the measurements of analog metrics, and 3) careful system calibration in a controlled environment. Hence in practice, when calibration is too costly or infeasible, their performance often degrades quickly in environments full of analog noise. For examples, RF RSS is noticeably affected by the antenna's orientation, and the RF phase measurements would be significantly distorted by multipath propagation.

Advanced analog-based localization techniques for tracking RFID tags have been described by Yang et al. in "Tagoram: Real-time tracking of mobile RFID tags to high precision using COTS devices," Proceedings of the 20th Annual International Conference on Mobile Computing and Networking, ACM, 237-248. Such techniques rely on probabilistic models to characterize and offset such noises and achieves better accuracy. However, it is known that when the signal of interest itself is analog, it is difficult to completely offset all noises. In contrast, digital approaches make binary decisions (either "1" or "0") on the existence of a signal/observation (e.g., a light signal as described herein) rather than depending on the absolute value of analog measurements in a calibrated model. Hence compared with analog approaches, digital approaches are more robust to noise, requiring minimum calibration overhead and more reliable.

Figure 1:
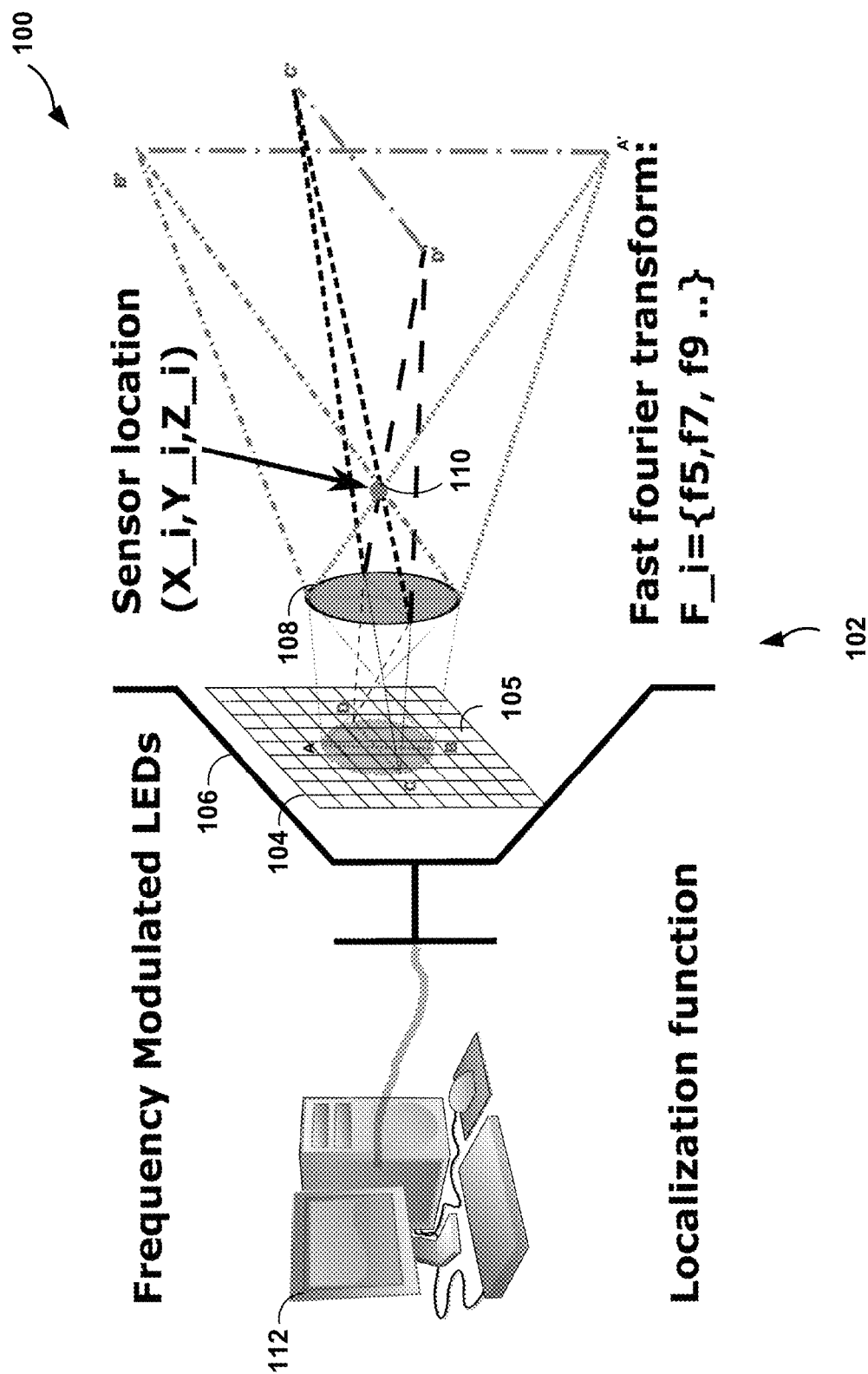
FIG. 1 illustrates an example digital 3D indoor localization system that uses light to perform digital localization, in accordance with one aspect of the disclosure.

FIG. 1 illustrates an example digital 3D indoor localization system that uses light to perform digital localization, in accordance with one aspect of the disclosure. In one example approach, system 100 includes receivers 110 and an LED lamp 102 oriented to illuminate the receivers 110. Receivers 110 may be, for instance, deployed at various locations within a room. In one example approach LED lamp 102 includes LEDs 105 arranged as an array of LEDs. In one such example approach, LEDs 105 within LED lamp 102 are modulated via modulation signals from computer 112.

As can be seen in FIG. 1, in one example approach, LED lamp 102 includes an LEDs 105 arranged as an array 104, a modulation distribution network 106, and a convex lens 108. In one such approach, LED array 104 is connected through modulation distribution network 106 to a computer 112 executing a program for modulating LEDs in LED array 104. System 100 exploits light splitting properties of a convex lens to create a one-to-one mapping between a location and light signals receivable at a receiver 110 at that location. Then by carefully designing a set of orthogonal light signals, an object is localized through binary detection of the set of light signals it receives. The approach described in the context of FIG. 1 is both generic and versatile, suitable for a broad range of applications such as robot/human 3D posture recognition, object tracking, and UAV indoor navigation.

By requiring only binary detection at a receiver, LED lamp 102 shifts all the complexity into a single LED lamp 102 and minimizes the complexity of the receiver 110. This asymmetric design concept significantly reduces the cost of light receivers 110, requiring, in some example approaches, only an inexpensive light sensor (e.g. photo-diode). This design approach also eliminates the need for calibration and reduces the deployment cost by non-professional end-users, hence encouraging massive adoption of localization system 100. Furthermore, even though a few existing systems have demonstrated their capabilities of indoor localization, LED lamp 102 is the first digital approach to achieve 3D localization of multiple objects simultaneously with a single lighting device. System 100 does depend on line-of-sight from LEDs in LED array 104 to receivers 110, but that is a common assumption among light-based systems.

The merits of LED lamp 102 are listed below on decreasing importance:

Digital localization: As a digital approach, LED lamp 102 has robustness against 1) environmental noise (e.g. sunlight, fluorescent lamps), 2) fluctuation of light source intensity, 3) receiver orientation, and 4) disturbance along light propagation paths (e.g. reflection and attenuation). We prove these features via extensive system evaluation.

Concurrent localization: A single LED lamp 102 is capable of localizing multiple receivers 110 simultaneously with a single round of digital light generation. This feature is important when there is a growing number of users in a given indoor space, e.g., a large number of customers in a supermarket.

Low-Cost localization: In one example approach, in a prototype system 100, LED lamp 102 was a COTS projector used to localize objects equipped with light sensors 110. LED lamp 102 reduces the receiver complexity to a minimum and requires only a single lighting device to cover an area.

In one example approach, LEDs 105 in LED array 104 all are modulated at a different frequency. This requirement is relaxed in the advanced designs of LED lamp 102, as described below.

Most LED fixtures today already consist of LEDs arranged in an array to approximate the same output as conventional lamps (because a single LED does not produce enough output for a mainstream application). Most such fixtures also include a convex lens attached on top of the LED array to direct light beams from the LEDs for desired applications. In one example approach, one can modify any such commercial light lamp into a 3D localization device 102 by coupling an LED array 104 with a convex lens. As shown in FIG. 1, LED lamp 102 device consists of an LEDs array 104 arranged on a panel and placed carefully adjacent to a circular convex lens 108, such that light rays from the LEDs 105 refract through the lens 108 and form an inverse and enlarged image on the other side of lens 108. In one such approach, LED array 104 (consisting of N×N individually controllable pixels) is controlled by a Computer/MCU 112 such that each LED pixel $P_i$ blinks at a unique frequency $f_i$ that acts as its identifier. In one such example approach, LEDs 105 are set to a fixed PWM duty circle so that LED lamp 102 still works as a homogeneous lighting device. A small form factor light sensor $S_i$ operating as receiver 110 receives light only from a partial set of all LED pixels at its location. In one example approach, light sensor $S_i$ analyzes the frequency spectrum of the received light signals, makes binary decisions on whether each frequency signal is received and sends back the received frequency components $F_i$(e.g. $\{f_5, f_7, f_9, \ldots\}$) back to the LED lamp 102 device for processing.

In another such example approach, light sensor $S_i$ captures the signals received from a portion of LEDs 105 and sends the signals to LED lamp 102 for processing. LED lamp 102 analyzes the frequency spectrum of the received light signals, makes binary decisions on the frequency signals received and determines the frequency components $F_i$(e.g. $\{f_5, f_7, f_9, \ldots\}$) received by sensor $S_i$ from LED lamp 102. In one example approach, in making the binary decisions, LED lamp 102 digitally considers all local peaks on the frequency spectrum instead of looking at their absolute amplitude. Based on the geometric properties of light rays refracting through the lens in forming a sharp image, LED lamp 102 calculates the 3D locations of each sensor $S_i(X_i, Y_i, Z_i)$ from the $F_i$ and the blinking frequencies across all LED pixels. It should be noted that the processing of the signals received at each receiver 110 can be offloaded to computer 112, or to other processing systems.

Figure 2:
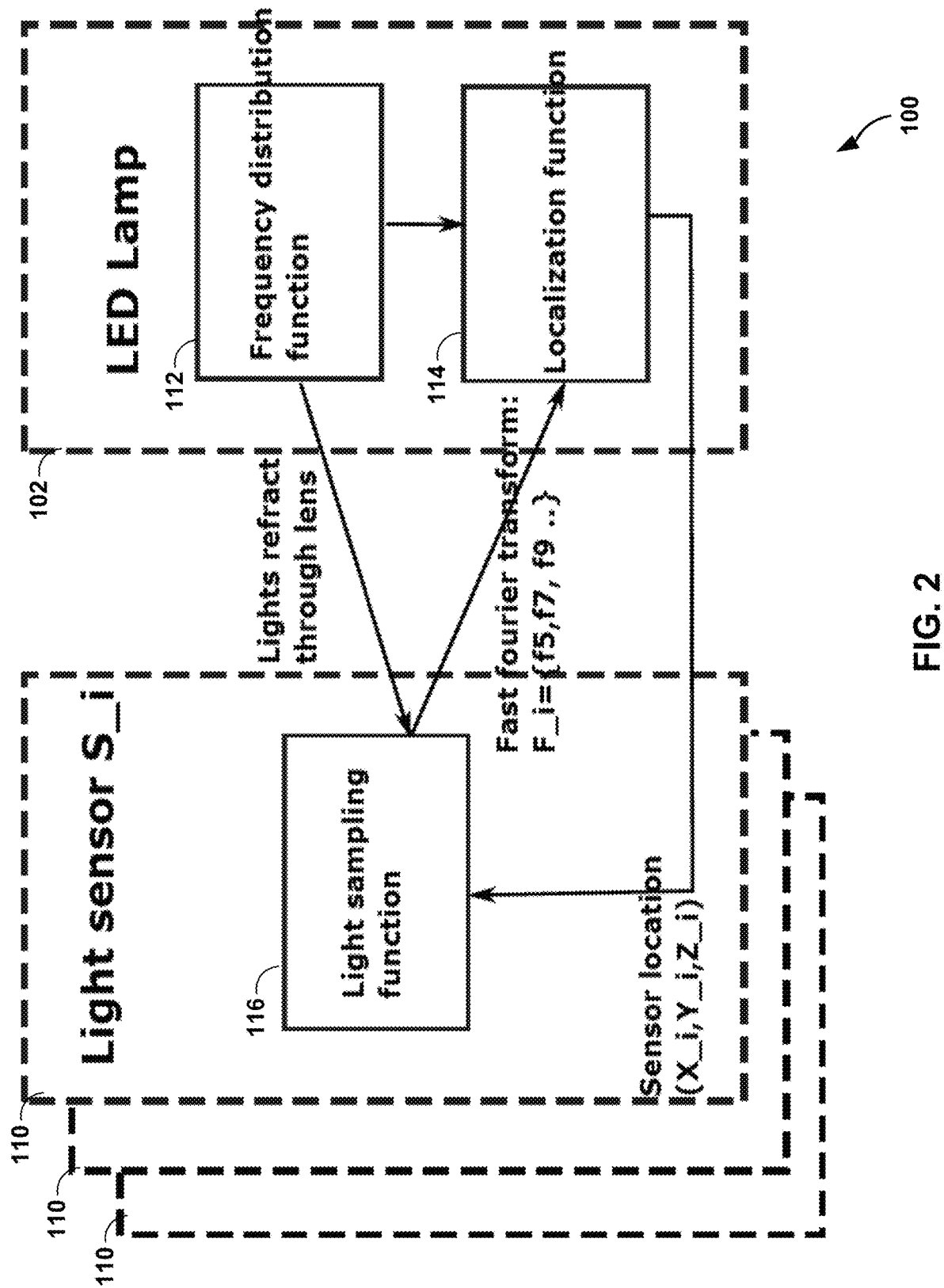
FIG. 2 illustrates another example digital 3D indoor localization system, in accordance with one aspect of the disclosure.

FIG. 2 illustrates another example digital 3D indoor localization system, in accordance with one aspect of the disclosure. In one example approach, system 100 includes receivers 110 and an LED lamp 102 oriented to illuminate the receivers 110. Receivers 110 may be, for instance, deployed at various locations within a room. In the example approach shown in FIG. 2, LED lamp 102 includes a light-based frequency distribution system 112 and a localization system 114. Receivers 110 include a light sampling system 116. In the example approach of FIG. 2, modulated light from frequency distribution system 112 illuminates light sampling system 116 in receiver 110. In one such approach, light sampling system 116 samples the modulated light received and sends the sampled waveform to localization system 114. In another such approach, light sampling system 116 determines the frequencies in the sampled waveform and sends a report detailing the frequencies to localization system 116 of LED lamp 102.

Figure 3:
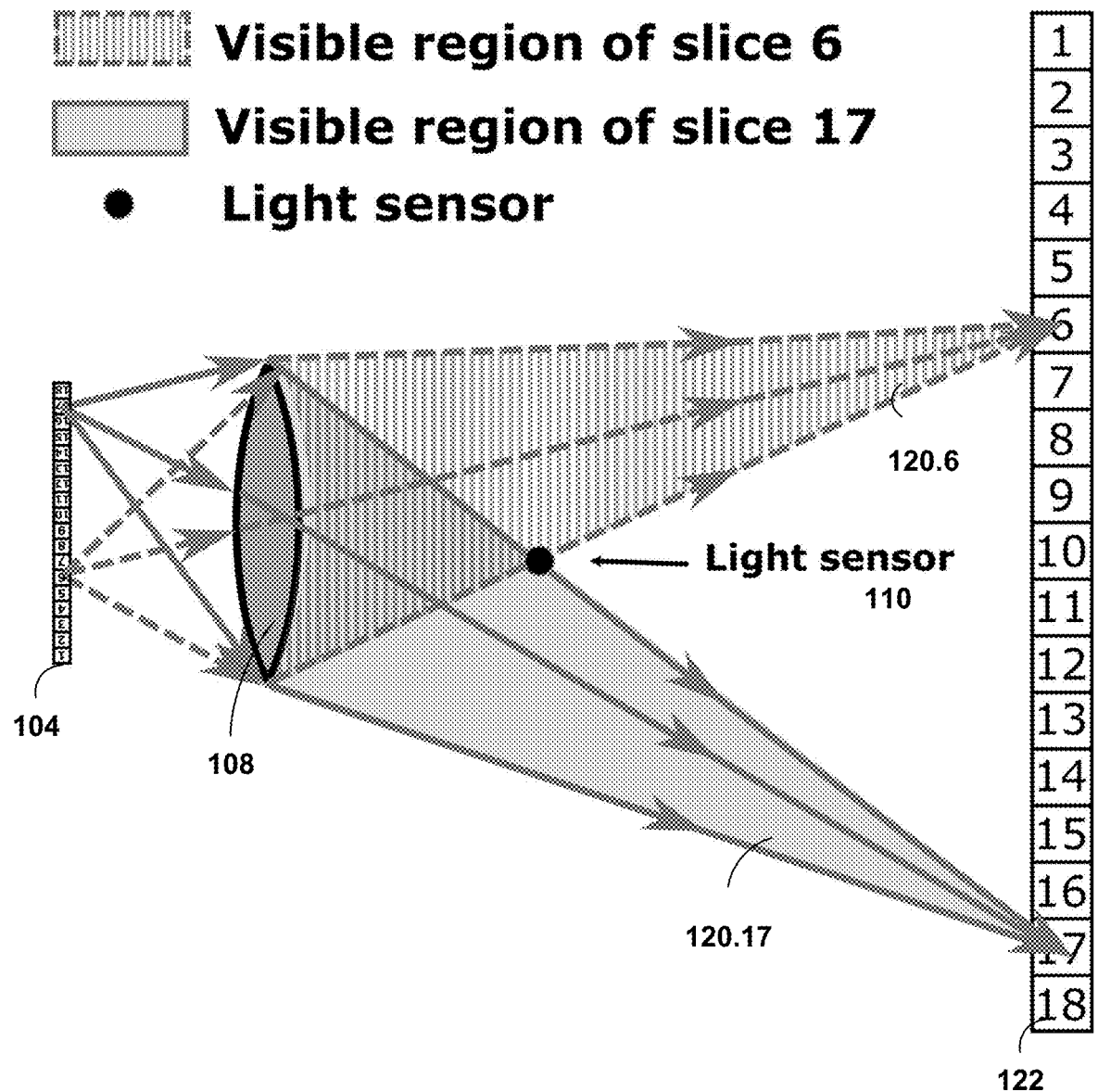
FIG. 3 illustrates localization based on signals received at a receiver, in accordance with one aspect of the disclosure.

FIG. 3 illustrates localization based on signals received at a receiver, in accordance with one aspect of the disclosure. In one example approach, system 100 operates in a 3D Cartesian coordinate system with the origin at the center of the lens 108, with X-axis being the upward direction, Y-axis being the horizontal right direction, and Z-axis being the perpendicular direction away from lens 108. In this Cartesian coordinate system, LED lamp 102 localizes each light sensor Si as its relative position $(X_i, Y_i, Z_i)$ to the lens center. As can be seen in FIG. 3, each LED pixel Pi on the panel of LED array 104 has a unique cone-shaped visible region 120 (the shaded cones of FIG. 3). As illustrated in FIG. 3, the visible region of any pixel ($P_i$) is the shaded region in which a pixel $P_i$ is detectable by a sensor 122 in receiver 110.

Figure 4B:
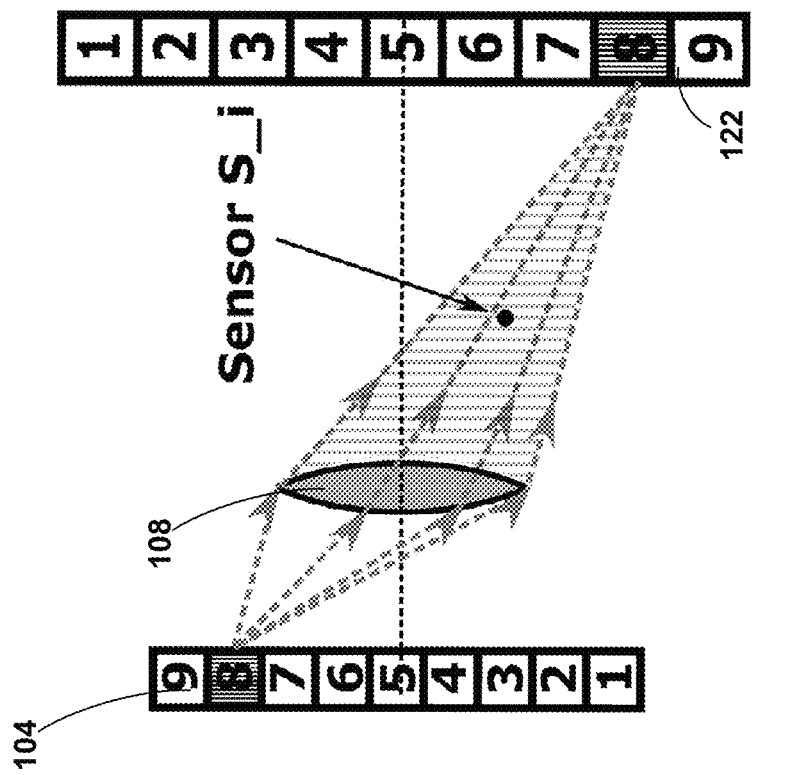
FIGS. 4A and 4B illustrate pixel illumination falling on receivers 110, in accordance with one aspect of the disclosure.
Figure 4A:
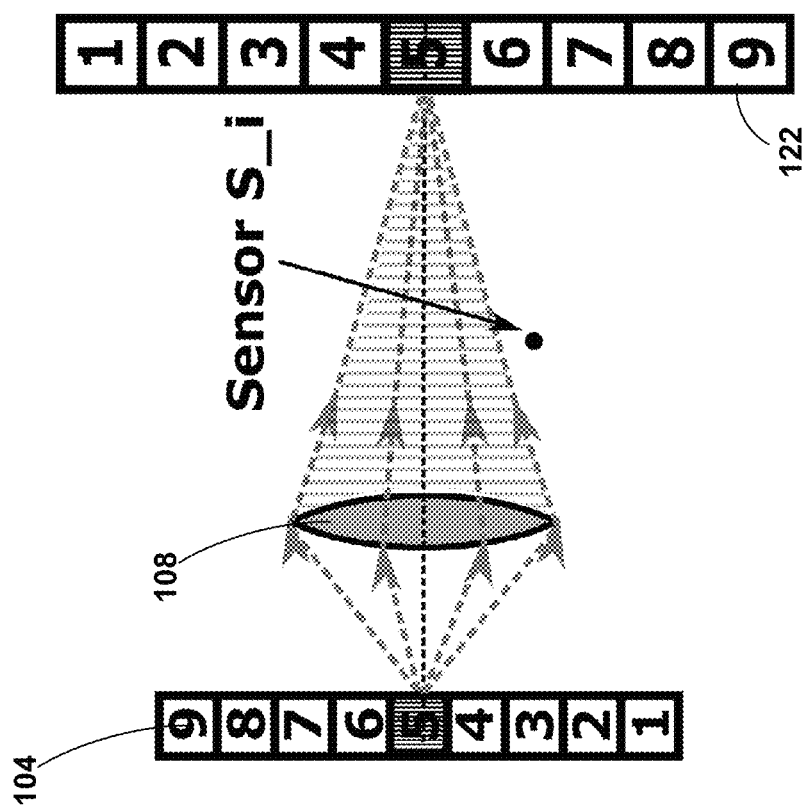

FIGS. 4A and 4B illustrate pixel illumination falling on receivers 110, in accordance with one aspect of the disclosure. In the examples shown in FIGS. 4A and 4B (shown in two dimensions), a light sensor $S_i$ receives light content from a partial set of all LEDs 105. In other words, $S_i$ is within the visible region 120 of only a few LEDs 105. In fact, the location of a light sensor $S_i$ on the right side of the lens is uniquely defined by the set of pixels it receives light from: $C_i = \{P_j | S_i \in VR(P_j), \forall j \in [1, N^2]\}$. From the FIGS. 4A and 4B, it is clear that, in one example approach, the localization region of LED lamp 102 spans from the center of the lens to the distance where a sharp image 122 of LED 104 is formed. In another example approach, the localization region can be selected to be to the right of image 122.

In one most example approaches, convex lens 108 is circular in shape and, therefore, $C_i = \{P_j | S_i \in VR(P_j), \forall j \in [1, N^2]\}$ is also a continuous circular area of pixels on the LED panel of LED array 104. It is not difficult to visualize that the "circle" $C_i$ of pixels grows bigger as $S_i$ moves closer to the lens; and that $C_i$ moves upward on the panel when $S_i$ moves vertically downward. In fact, the vertical distance from the sensor 110 to the lens 108 may be calculated with only the size of the "circle" $C_i$. The vertical and horizontal position $X_i, Y_i$ of the sensor can be calculated with the $C_i$ size and its location on the panel. Hence the problem of localizing a light sensor $S_i$ at $(X_i, Y_i, Z_i)$ is now equivalent to the problem of locating its observable "circle" of pixels $C_i = \{P_j | S_i \in VR(P_j), \forall j \in [1, N^2]\}$ on the LEDs array panel. In one example approach, locating $C_i$ on the LED panel simply involves comparing the frequency signals $F_i$ received at $S_i$ with the blinking frequency distribution across the LED pixels.

Figure 5:
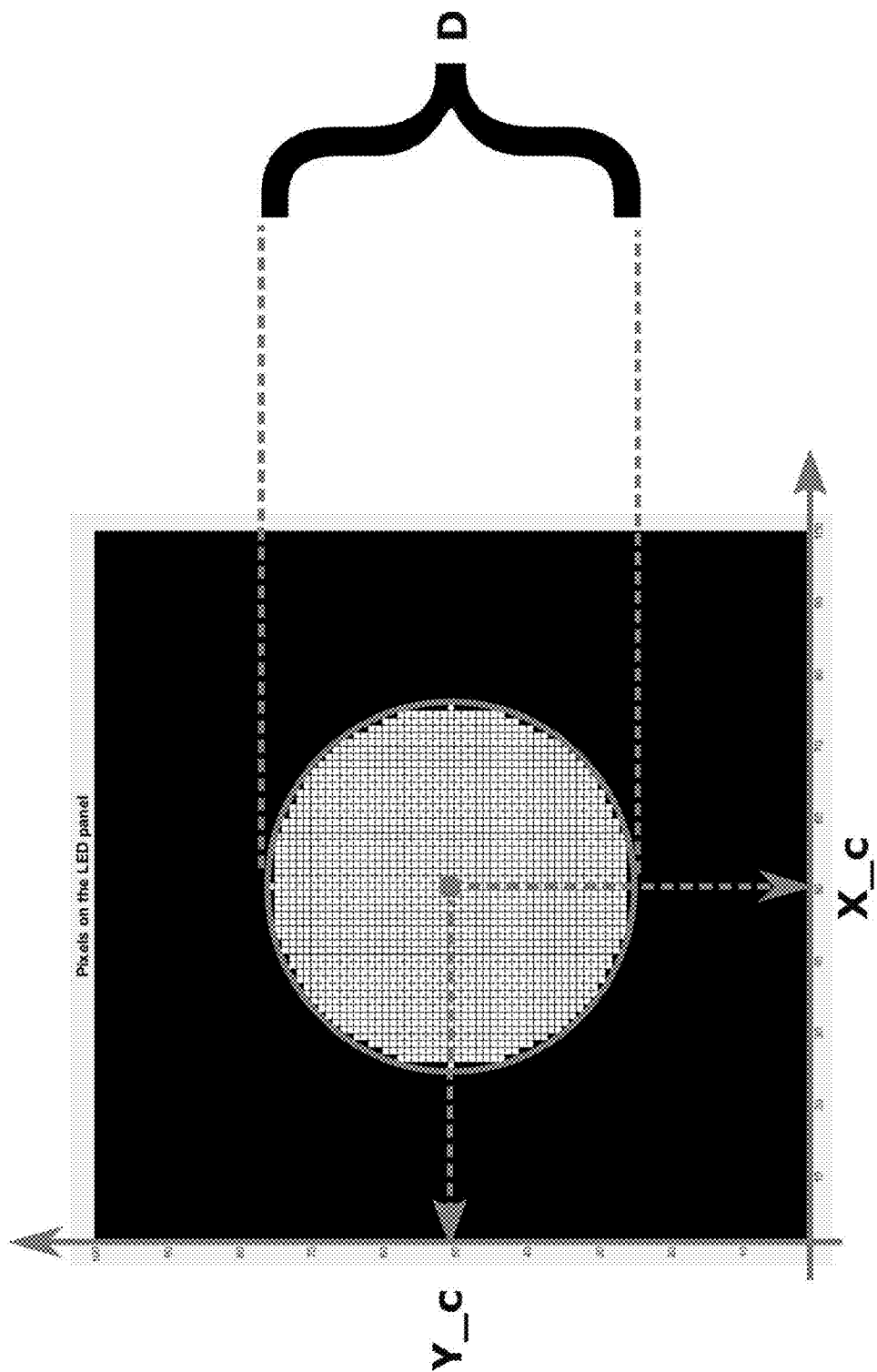
FIG. 5 illustrates a binary bitmap representing light from the LED lamp falling on a sensor, according to one aspect of the disclosure.

FIG. 5 illustrates a binary bitmap representing light from an LED lamp falling on a sensor, according to one aspect of the disclosure. FIG. 5 visualizes $C_i = \{P_j | S_i \in VR(P_j), \forall j \in [1, N^2]\}$ using a 2D binary bitmap where pixels are marked as white if their blinking frequency matches one of the received light frequencies, in accordance with one aspect of the disclosure. As expected, a circle area of "white" pixels shows up in the bitmap plot.

A method of calculating the 3D location of a light sensor based on the geometrical optical property of the convex lens 108 will be described next. Note that the geometrical optical property is fixed for a particular lens and is not influenced by external environment, eliminating the need for in-situ calibration. Table 1 includes symbols used in calculating the location.

TABLE 1

Symbols used in Equ. 3, 4, 5

| | |
|---|---|
| $S_i$ | A light sensor i |
| $C_i$ | Set of pixels shedding light on $S_i$ |
| R | Radius of the lens |
| N | Number of pixels in one dimension of the panel |
| f | Focal length of the lens |
| $d_o$ | Distance from the LED panel to the lens |
| $d_i$ | Distance from the lens to the sharp image |
| D | Number of pixels in the diameter of the circle C |
| h | LED panel has the dimension h(meter)*h(meter) |
| $X_c$ | Num. of pixel from $C_i$ center to the left of panel |
| $Y_c$ | Num. of pixel from $C_i$ center to the right of panel |
| K | Number of times each frequency is reused |

Localizing in the Z-axis: The perpendicular distance (sometimes referred to as the depth) from the sensor to the lens $Z_i$ is a function of only the size of the pixel circle $C_i = \{P_j | S_i \in VR(P_j), \forall j \in [1, N^2]\}$. This agrees with an observation that a light sensor receives light from more pixels as it moves closer to the lens. The equation to calculate $Z_i$ as a function of D, the number of pixels in the diameter of the circle $C_i$, is given in Equation.1.

$$Z_i = f_A(D) = \frac{2RN \; fd_o}{2RN \; (d_o - f) + fhD} \quad (1)$$

where A is a combined symbol representing all hardware parameters including: R—diameter of the lens (unit: meter), N—number of pixels in dimension of the LED panel (unit: 1), f—focal length of the lens (unit: meter), $d_o$—distance from the LED panel to the lens (unit: meter) and h—actual height of the LED panel (unit: meter).

Localization in the X, Y-axis: $X_i$ and $Y_i$ depend on both the diameter D and location of the circle center $(X_i, Y_i)$ of $C_i$ on the LED panel. The equation to calculate $X_i$ and $Y_i$ as a function of D, $X_c$ and $Y_c$ is given below.

$$X_i = F_A(D, X_c) = \frac{hfR(N - 2X_c - D)}{2RN(d_o - f) + fhD} \quad (2)$$

$$Y_i = f_A(D, Y_c) = \frac{hfR(N - 2Y_c - D)}{2RN(d_o - f) + fhD} \quad (3)$$

The above equations are derived by Liu et al. in "SmartLight: Light-weight 3D Indoor Localization Using a Single LED Lamp," Proceedings of the 15th ACM Conference on Embedded Network Sensor Systems, Nov. 6-8, 2017, Delft, Netherlands, the discussion of which is incorporated herein by reference.

In the example approach described above, LED lamp 102 modulates each LED pixel at a unique PWM frequency. Such an approach performs well at localizing in a small space with low requirement on localization granularity. However, if LED lamp 102 is used to localize in a large work space such as the distribution center, an increasing number of pixels and unique frequencies are required to guarantee the same accuracy. To guarantee the system scalability and efficiency, it can be advantageous to reduce the required number of unique frequencies. This section proposes advanced designs to improve LED lamp 102 across scalability and reliability.

In one example approach, system 100 reduces the total number of frequencies required from N*N to (N*N)/K by reusing each frequency K times. K is the "reuse ratio." Each pixel $P_i$ is randomly allocated one of the (N*N)/K frequencies with a uniform probability of K/(N*N). As detailed above, due to the light refracting property of convex lenses, a light sensor $S_i$ receives light from only a circular area of pixels $C_i=\{P_j|S_i\in VR(P_j), \forall j\in[1,N^2]\}$ on the LED panel. Understandably some LED pixels in $C_i$ may blink at the same frequencies. We denote the number of unique frequencies that $S_i$ receives as K'. The probability for another pixel outside of $C_i$ to also blink at one of the frequencies received is $\rho=K'/((N*N)/K)$.

LED lamp 102 compares the received frequency components $F_i$(e.g. $\{f_1, f_3, f_9 \ldots\}$) by a sensor $S_i$ with the blinking frequencies of each LED on the panel. In one example approach, a 2D bitmap array with the same dimension N*N is used to represent all LED pixels on the panel. A value of either "1"(Yes) or "0"(No) is allocated to each bitmap element. "1" presents that the corresponding LED blinks at one of the received frequencies in Fi and "0" otherwise.

Figure 6:
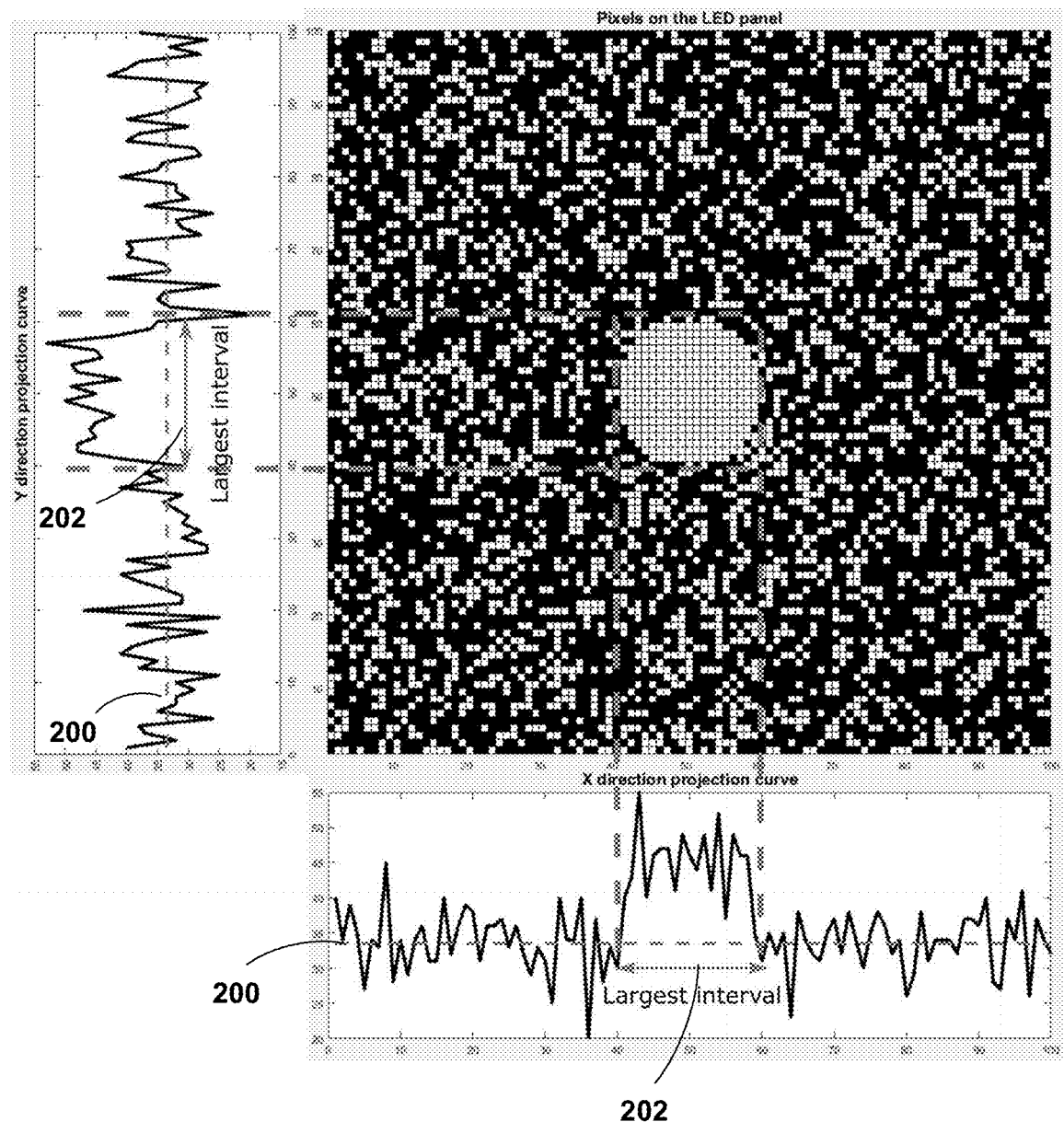
FIG. 6 illustrates another binary bitmap representing light from an LED lamp falling on a sensor, according to one aspect of the disclosure.

FIG. 6 illustrates a binary bitmap that illustrates light from an LED lamp falling on a sensor, according to one aspect of the disclosure. In the example shown in FIG. 6, a pixel is shown as "white" if the corresponding array element value is "1". Compared with FIG. 5 in the basic design, the task now becomes how to find the circular area of pixels $C_i=\{P_j|S_i\in VR(P_j), \forall j\in[1,N^2]\}$ hidden in the "ocean" of sparse false positive "white" dots. The false positive pixels exist because every frequency is randomly reused, and these pixels happen to be allocated the same frequency as one of the LEDs in $C_i$. Notice that the light sensor $S_i$, at its location, does NOT actually receive the light associated with the false positive "white" pixels.

In one approach, system 100 uses frequency-shift keying (FSK) to modulate LEDs 5 and makes binary decisions on the existence of frequencies instead of their absolute amplitude. In such an approach, system 100 is resistant to random ambient real-life noises such as sunlight and fluorescent lamps (after avoiding power line frequency).

As a sidebar, techniques exist in the literature to find the "circle" $C_i$ in a bitmap full of noises, including density-based clustering technique DB-SCAN and image processing techniques such as circular Hough transform (CHT). Neither approach is suitable for system 100. DB-SCAN can be time-costly as it requires computing all pairwise proximities to find out the nearest neighbors. Worse still, the accuracy of DBSCAN depends on user-specified parameters including "Eps" and "MinPts", which are particularly difficult to specify in the design of system 100 because circle sizes and the distribution of false positive pixels is not fixed. CHT requires too much storage and computing power to be used for a real-time application like localization. With the radius unknown, CHT must go through multiple steps including edge detection preprocessing, radius estimation and voting for the circle. It also must deal with numerous spurious circles present after edge detection.

Instead, in one example approach, system 100 uses multi-directional projection to detect the circle $C_i$. In one such example approach, a technique for locating the circle $C_i$ converts the 2D problem of locating a circle into a 1D problem of finding a peak. As shown in FIG. 6, the N*N 2D bitmap array is projected (shadowed) onto the X-axis direction by counting the number of "1s" in each vertical column, thereby forming a new 1*N 1D vector. This 1D vector can be considered as the shadow of the 2D array in the x-axis direction. It represents the number pixels in each column of the LED panel that are marked "white". FIG. 6 plots the 1D vector as a curve. The shadow of the "circle" is apparently located at the "peak" of the curve. To find the peak, a horizontal line 200 with a constant value y=ρ*N is used to intercept the curve. Consider the intervals bounded by every pair of adjacent intersection points. The largest intersection interval 202 is used as the peak interval and the shadow of the circle. The line y=ρ*N is used to intercept the curve because it is the probabilistic mean value of any 1D vector element outside of the circle shadow region. Repeat the above steps once more in the y-axis to find the full location of the circle $C_i$ on the panel. To further increase the accuracy, take the average results of repeating the above directional projection procedure in multiple different directions. See detailed justifications and analysis in Liu et al. in "SmartLight: Light-weight 3D Indoor Localization Using a Single LED Lamp," Proceedings of the 15th ACM Conference on Embedded Network Sensor Systems, Nov. 6-8, 2017, Delft, Netherlands, the discussion of which is incorporated herein by reference.

Figure 7:
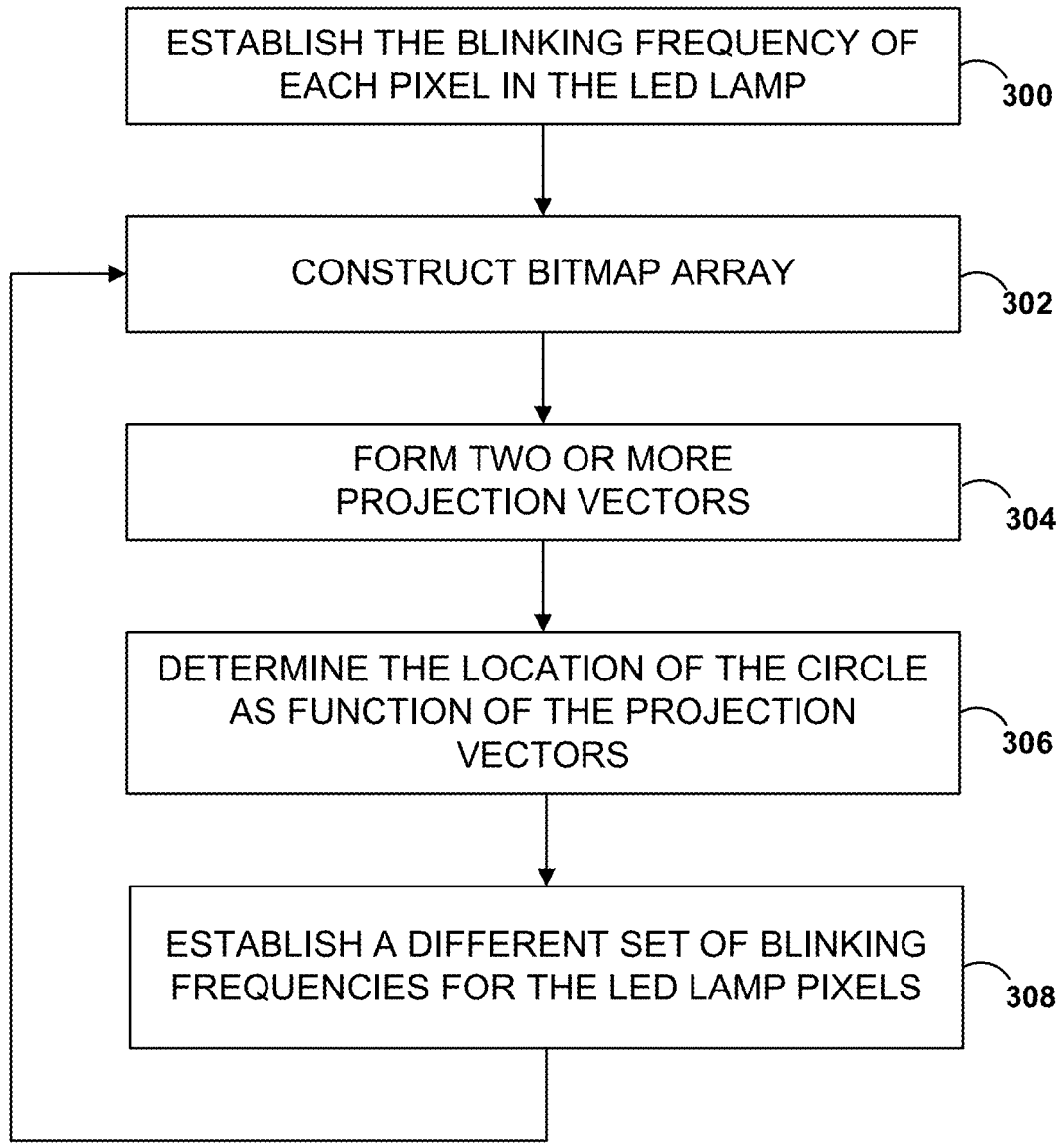
FIG. 7 illustrates a binary bitmap representing light from a partially obstructed LED lamp falling on a sensor, according to one aspect of the disclosure.

FIG. 7 illustrates a method of locating the circle, in accordance with one aspect of the disclosure. In the example of FIG. 7, system 100 establishes the blinking frequency of each LED pixel on the LEDs array panel through random frequency reuse, as detailed above (300). In one example approach, each light sensor $S_i$ analyses the received frequency components $F_i$(e.g. $\{f_3, f_5, f_9, f_{11}\}$) in its received light, and sends $F_i$ back to LED lamp 102. A 2D integer bitmap array with the same dimension of the pixels N*N is constructed to represent if the corresponding pixel blinks at one of the frequencies in $F_i$(302). In one such example approach, an array element is valued either "1"(Yes) or "0"(No), as detailed above.

System 100 projects the N*N 2D bitmap array onto the X-axis, forming a new 1D vector by, for instance, counting the number of "1s" in each column. In one example approach, system 100 plots the 1D vector as a curve. In one example approach, system 100 repeats the above steps in the y-axis direction and several other directions (304) and then calculates the full location of the circle on the LED panel as a function of the projections (306).

In one example approach, system 100 may increase the accuracy of the calculation of the full location of the circle by repeating the above procedures m times, each time using a different set of random blinking frequencies for the LEDs array (308).

Figure 8:
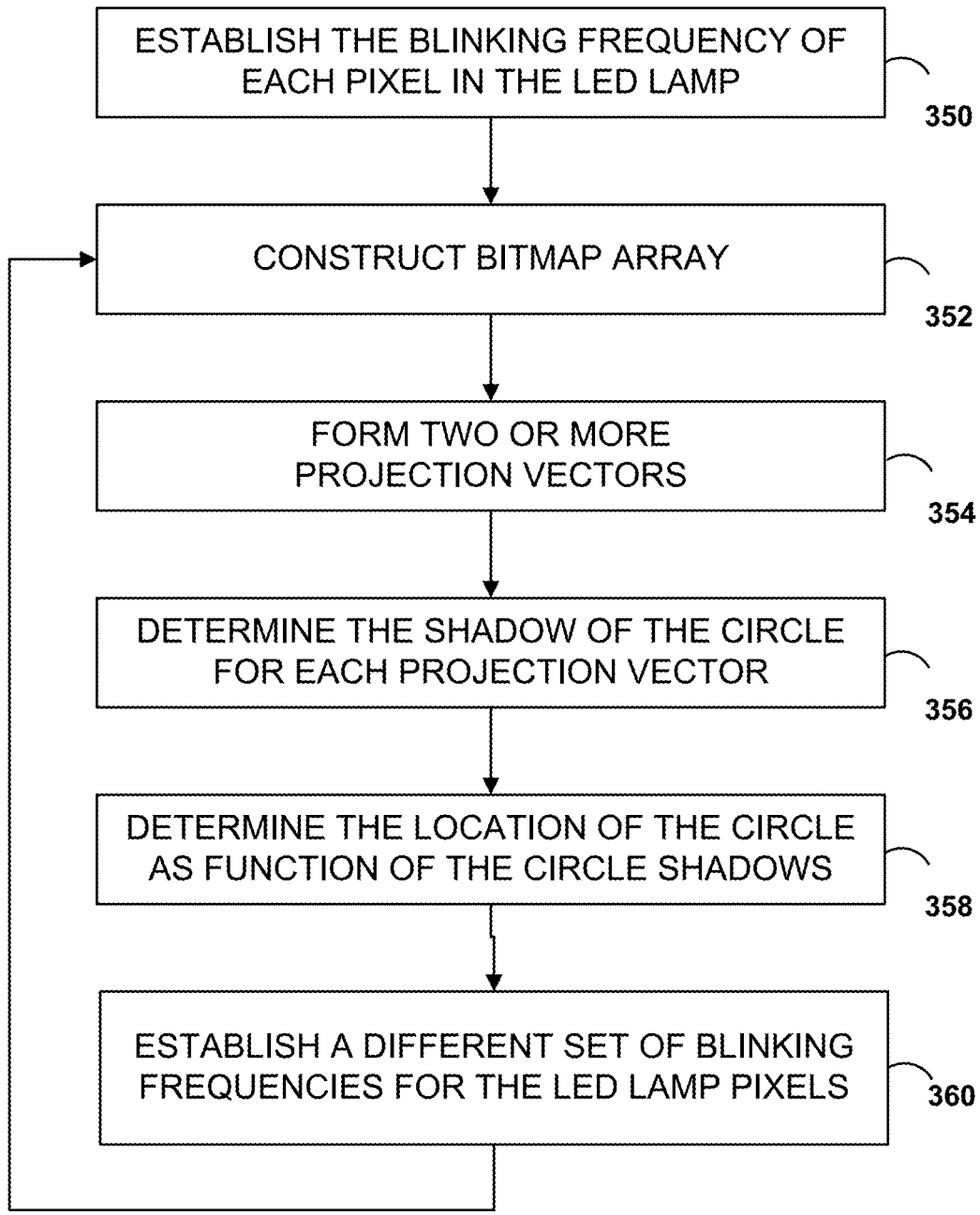
FIG. 8 illustrates another method of locating the circle, in accordance with one aspect of the disclosure.

FIG. 8 illustrates another method of locating the circle, in accordance with one aspect of the disclosure. In the example of FIG. 8, system 100 establishes the blinking frequency of each LED pixel on the LEDs array panel through random frequency reuse, as detailed above (350). In one example approach, each light sensor $S_i$ analyses the received frequency components $F_i$(e.g. $\{f_3, f_5, f_9, f_{11}\}$) in its received light, and sends $F_i$ back to LED lamp 102. A 2D integer bitmap array with the same dimension of the pixels N*N is constructed to represent if the corresponding pixel blinks at one of the frequencies in $F_i$(352). In one such example approach, an array element is valued either "1"(Yes) or "0"(No), as detailed above.

System 100 projects the N*N 2D bitmap array onto a number of projections, forming new 1D vectors for each projection by, for instance, counting the number of "1s" in each column (354). In one example approach, system 100 plots the 1D vector as a curve. All 1D vector elements outside of the circle shadow on the curve should oscillate randomly around a mean value of ρ*N. In one example approach, system 100 applies a horizontal constant value line y=ρ*N to intercept the wave and uses the largest interception interval as the shadow of the circle $C_i$ on the x-axis direction (356). System 100 then calculates the full location of the circle on the LED panel as a function of the shadows of the circles (358).

In one example approach, system 100 increases the accuracy of the calculation of the full location of the circle by repeating the above procedure m times, each time using a different set of random blinking frequencies for the LEDs array (360).

False Detection Elimination will be discussed next. The effect of using a constant line y=ρ*N to intercept the projection curve can be seen by projecting the 2D array toward the X-axis direction. For example, the circle $C_i$ system 100 is trying to localize on the 2D bitmap may be centered at (100, 100) with a radius of 20 on the LED panel. Only 2000 available frequencies are used in the system, which saves 95% of frequencies as would be required by the basic design of LED lamp 102. After the 2D to 1D projection, the shaded peak region of the curve is apparently the shadow of the circle $C_i$ on X-axis direction. This region is termed the circle shadow region. Anywhere else on the curve outside of the circle shadow region essentially counts the number of false positive white pixels in the corresponding N*1 column in the 2D bitmap array. Since each pixel outside of $C_i$ has the probability ρ to be marked white, each value on the curve and outside of the circle shadow region is thus a random variable that follows the Gaussian distribution X~N (ρN,Nρ(1-ρ)), with a mean of ρ*N and variance of Nρ(1-ρ). Each value on the curve outside of the circle shadow region has a 50% probability to be above its mean value y=ρ*N and another 50% probability to be below its mean. Thus, having an intersection interval of length L at a certain location outside of the circle shadow region is equivalent to having (L-1) consecutive Gaussian random variables larger than its mean value. The probability of an intersection interval of length L at a certain location outside of the circle shadow is calculated as $$\left(\frac{1}{2}\right)^{L-1}.$$

The probability of having a false positive intersection interval L=6 at a certain location outside the circle shadow is 3.125%.

That the false positive rate from a single projection is 3.125% does not fully represent the full power of the techniques described for system 100. By combining the projecting results in a large enough number of directions, the probability of a false positive circle is negligible. To yield a false positive circle $C_i$, the projection results in each direction must be consistent with each other. First, their false positive intersection interval must be of the same length; Second, the false positive intersection intervals in each direction must be the shadow of the same circle. The probability of projection results to consistently yield a false positive circle at a certain location is equivalent to the probability of having a continuous circle of false positive white pixels there. Since the probability of one false positive white pixel outside of $C_i$ is ρ, the probability of a false positive circle $C_i$ of the diameter of D pixels at a certain location is thus calculated as $$\rho^{\pi*\left(\frac{D}{2}\right)^2}.$$

To further increase the robustness of LED lamp 102, the same algorithm procedures can be repeated m times with a different set of randomized blinking frequency pattern across all LED pixels. The results returned from all experiments should report the same circle before it is accepted as the real $C_i$. The probability of a false positive circle $C_i$ with a diameter of D at a certain location is hence further reduced to $$\rho^{\pi*\left(\frac{D}{2}\right)^2*m}.$$

Such an approach has, therefore, superior robustness against noises of false positive white pixels.

Although extremely rare, system 100 is capable of recovering from the case that the shadow region of the circle may be separated into two intersections. This reason may be, for instance, because white pixels from the circle are not enough to offset the random variation from other pixels. The first strategy is to combine long adjacent intersections as we proved earlier that a false positive intersection interval longer than six is rare. The second strategy is to reduce the standard deviation of pixels outside of $C_i$ by using the mean value of multiple random variable samples. We may achieve this by repeating the experiment m times with different blinking frequencies across the pixels, then take the mean of the m bitmaps generated, and then finally use the mean of m interception curves to intercept the projection curve of the mean bitmap in order to find the circle shadow. Consider the probability of the circle shadow on the x-axis separated into two smaller intersection intervals. Denote the number of white pixels contributed by the circle $C_i$ at this location of the curve as Δ. The number of white dots pixels outside of $C_i$ in the same column is a random variable rv that follows normal distribution rv~N(ρ*(N-Δ),(N-Δ)ρ(1-ρ)). The probability of the circle shadow divided here is thus Probability(rv+Δ<N*ρ), where (rv+Δ) can be treated as a new random variable that follows a new normal distribution (rv+Δ)~N(ρ*(N-Δ),(N-Δ)ρ(1-ρ)). By repeating the experiments m times and use the mean value Var($\overline{rv}$), Probability (rv+Δ<N*ρ) is reduced give that ($\overline{rv}$+Δ)~N($\overline{\rho}$*(N+Δ)+Δ,(N-Δ)$\overline{\rho}$(1-$\overline{\rho}$)/m) has a reduced variance. That is, let rv1, rv2, . . . , rvn be a n random sample from an identical distribution, Var($\overline{rv}$)=(Var(rv1)+Var(rv2)+ . . . Var (rvn))/$N^2$=(1/N)Var($\overline{rv}$).

In one example approach, system 100 is performs localization of multiple sensors in parallel. Multiple light sensors at different locations receive light from a different set of light pixels on the LED panel. In one such approach, LED lamp 102 localizes multiple light sensors simultaneously without changing the blinking frequency patterns across the LED pixels. To do this, LED lamp 102 treats the received light frequency components $F_i$ of each sensor separately and find its circle of pixels $C_i$ by comparing $F_i$ with the blinking frequencies of all LED pixels. For example, when two sensors $S_1$ and $S_2$ send their respective received frequencies $F_1$ and $F_2$ to the LED lamp 102 controller, LED lamp 102 will not combine $F_1$ and $F_2$. Instead, it compares $F_1$ with the blinking frequency of each pixel to find $C_1$; it compares $F_2$ with the blinking frequency of each pixel to find $C_2$, etc.

It should be noted that the localization error of LED lamp 102 increases with Z-axis distance. This effect is not mainly due to the lower signal-to-noise ratio (SNR) at further distances from the projector. In fact, the impact of the signal-to-noise ratio is largely subdued by the digital approach of making binary decisions in LED lamp 102's localization algorithm. If N is large enough, degradation in localization granularity at longer distances becomes increasingly unnoticeable.

As the number of LED pixels "N" in one dimension of the LED panel increases, the projected grids have a finer granularity. Understandably localization accuracy of the LED lamp 102 basic design improves as N increases. Localization granularity in estimating the distance to the projector improves substantially as N increases from 76 to 1000. Furthermore, as N increases, the required percentage of unique frequencies needed decreases.

Ambient light has no noticeable impact on the performance of LED lamp 102 as long as the light sensor is not saturated. This is expected because ambient noises in practical life such as lighting (after avoiding power line frequency) and sunlight do not carry a fixed frequency. In addition, the performance of LED lamp 102 is little impacted by an uncalibrated decrease on signal strength.

System 100, therefore, is a light-based 3D indoor localization design that models the refracting path of light rays and makes binary decisions on the reception of frequency modulated signals. System 100 is highly robust and accurate because it does not assume an in-situ signal strength attenuation model or rely on absolute signal strength. It achieves centimeter level accuracy even on a low refresh rate projector implementation. System 100 has demonstrated experimentally that LED lamp 102 is robust to various environmental and operational effects, indicating the potential digital localization can offer. With the availability of rapidly-switching LEDs 105 in LED array 104 in a future version of LED lamp 102, localization granularity will improve further.

Figure 9:
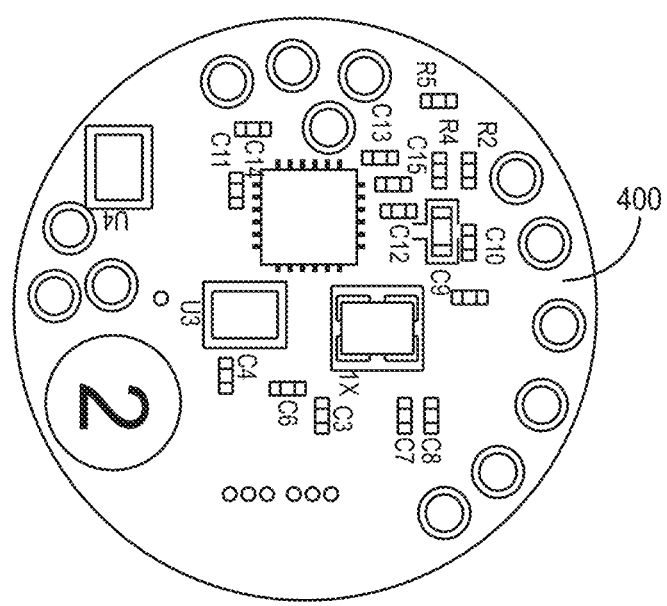
FIG. 9 illustrates a button-sized wearable device, in accordance with one aspect of the disclosure.

FIG. 9 illustrates a button-sized wearable device, in accordance with one aspect of the disclosure. In the example approach of FIG. 9, button 400 typically rests in a low power sleep mode but wakes up from sleep with a low lag and delivers high-fidelity data wirelessly with a bare-minimum power of 0.2574 mW in its most efficient mode and 53.0475 mW in a rigorous mode. In one example approach, button 400 has a diameter of 25 mm and is powered by a coin battery. It may be designed, for instance, with a TI CC2511 SoC with a 2.4 GHz SMD 2450AT18A100 antenna and a SMD 12-C digital RGB color sensor on board. In one such example approach, light sensor 122 has an extremely small dimension of 3.0*4.2*1.3 mm, a photosensitive area of 0.54×1.1 mm and consumes an average of 0.2475 mW power in active mode.

The localization approaches described above work even when line of sight is partially blocked. An example technique for localizing the light sensor even when a portion of the path to an object is partially blocked is described in the context of FIG. 10.

Figure 10:
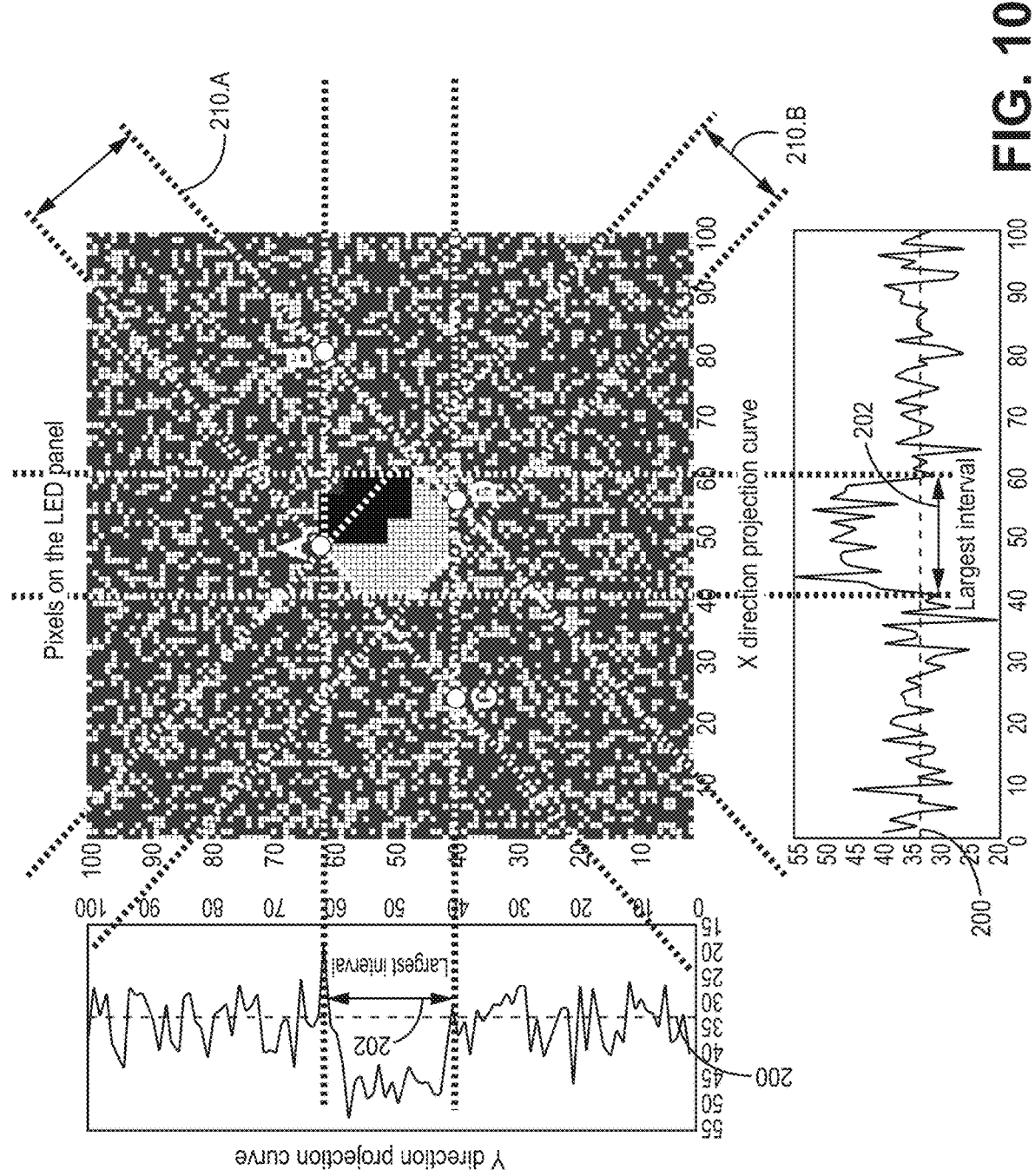
FIG. 10 illustrates a binary bitmap representing light from a partially obstructed LED lamp falling on a sensor, according to one aspect of the disclosure.

FIG. 10 illustrates a binary bitmap representing light from a partially obstructed LED lamp falling on a sensor, according to one aspect of the disclosure. As discussed above, light sensors 110 receive light signals from a circular region of LED light pixels when there is no obstruction of line-of-sight. When there is partial obstruction light, the circular region may be degraded into a "waning moon" or "half-moon" shape, as illustrated in FIG. 10. The problem may therefore be reduced to reconstructing the full circular region, i.e., its center and radius from the "waning moon" shape.

One solution is to project the 2D bitmap in multiple directions as shown by the projection lines 210 in FIG. 10. If the "waning moon" shape still preserves a moderate proportion of the circular edge, the multiple projection lines may be used to reconstruct the full circle. Without obstruction of light, the vertical projection lines all remain tangent to the full circle. Every two pairs of projection lines intersect and forms a parallelogram at the center of the circle in FIG. 10. The center of the parallelogram is the circle center and the perpendicular distance between each pair of lines is the diameter. Hence when there is partial obstruction of light, false positive projection lines will form smaller parallelograms with the other pairs of projection lines reflecting the unblocked areas of the center. In the example illustrated in FIG. 10, projection 210.A and 210.B form a parallelogram defined by the edges of the half-moon shape. False positives may be disregarded or may be given a much lower weight in determining the circle center. In one example approach, the circle center is calculated as a weighted average of all parallelogram centers.

Figure 11:
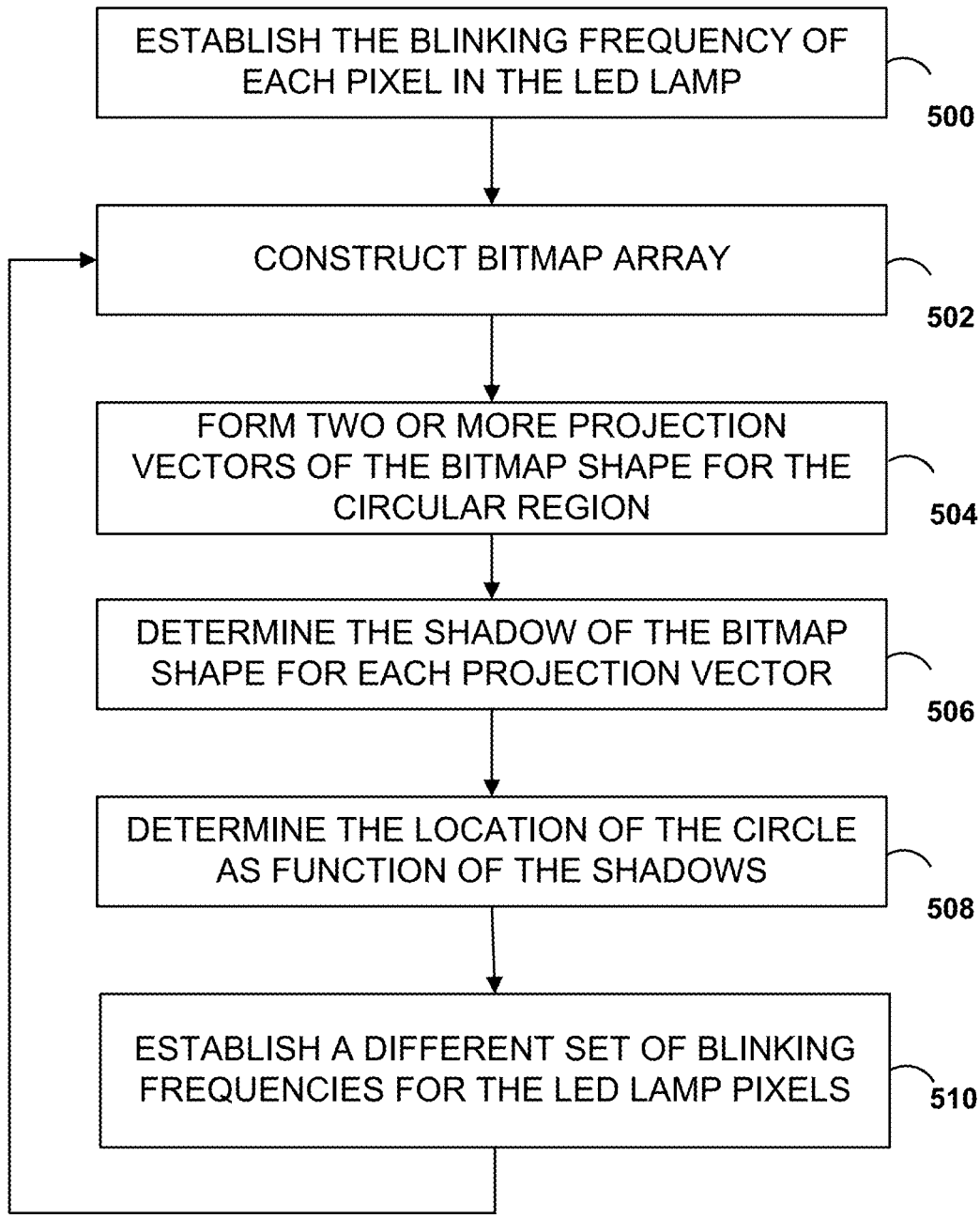
FIG. 11 illustrates a method of locating the circular region when the light from LED lamp is partially blocked, in accordance with one aspect of the disclosure.

FIG. 11 illustrates a method of locating the circular region when the light from LED lamp 102 is partially blocked, in accordance with one aspect of the disclosure. In the example of FIG. 11, system 100 establishes the blinking frequency of each LED pixel on the LEDs array panel through random frequency reuse, as detailed above (500). In one example approach, each light sensor $S_i$ analyses the received frequency components $F_i$ (e.g. $\{f_3, f_5, f_9, f_{11}\}$) in its received light, and sends $F_i$ back to LED lamp 102. A 2D integer bitmap array with the same dimension of the pixels N*N is constructed to represent if the corresponding pixel blinks at one of the frequencies in $F_i$ (502). In one such example approach, an array element is valued either "1"(Yes) or "0"(No), as detailed above.

System 100 projects half-moon shape of the N*N 2D bitmap array onto a number of projections, forming new 1D vectors for each projection by, for instance, counting the number of "1s" in each column (504). In one example approach, system 100 plots the 1D vector as a curve. All 1D vector elements outside of the circle shadow on the curve should oscillate randomly around a mean value of ρ*N. In one example approach, system 100 applies a horizontal constant value line y=ρ*N to intercept the wave and uses the largest interception interval as the shadow of the circle $C_i$ on the x-axis direction (506). System 100 then calculates the full location of the circle on the LED panel as a function of the shadows of the circles (508).

In one example approach, system 100 increases the accuracy of the calculation of the full location of the circle by repeating the above procedure m times, each time using a different set of random blinking frequencies for the LEDs array (510). The above technique works more effectively in determining the sensor location when the majority portion of the circular shape is preserved and is less effective as the amount of obstruction increases.

The impact of design choices will be discussed next. As the number of LED pixels "N" in one dimension of the LED panel increases, the projected grids have a finer granularity.

Understandably localization accuracy of the system 100 design improves as N increases.

The reuse ratio reduces the required unique frequencies while maintaining similar accuracy. For N=1000, system 100 requires less than 2% (K=50) of unique frequencies to achieve comparable performance in the basic design. In fact, as N further increases, the required percentage of unique frequencies further decreases.

System 100 uses Frequency-shift keying and makes binary decisions on the existence of frequencies instead of their absolute amplitude. System 100 is, therefore, resistant to random ambient noises in real life, such as sunlight and fluorescent lamps (after avoiding power line frequency). Tests showed that ambient light has no noticeable impact on the performance of system 100 as long as the light sensor is not saturated. This is expected because ambient noises in practical life such as lighting (after avoiding power line frequency) and sunlight do not carry a fixed frequency.

Epsilon, Weighted-average and Coverage depend on received signal strength; hence they have to carefully calibrate each lighting device to account for the device diversity. System 100 suffers little impact from uncalibrated decreases on signal strength. Epsilon are most affected by the unexpected change in the emitted power without calibration as it reuse the absolute RSS value to infer distance.

Receiver orientation has an effect on received signal strength. Received light signal strength is directly related to the incidence angle of light by a roughly cosine relationship. Therefore, indoor localization techniques that rely on calculating distances from the received signal strength must carefully account for the impact of device orientations to guarantee accuracy. Epsilon, for example, uses cellphone IMU chip (combination of accelerometer, magnetometer, and gyroscope sensors) to estimate the receiver orientation used in a Lambertian propagated signal strength model.

Error in orientation estimation is usually the main source of localization error. The approach used for system 100 localizes the "light sensitive area" on a sensor by modeling the traveling paths of light rays instead of the absolute received signal strength. Hence it does not require the information of receiver orientation. Likewise, the design of system 100 reduces the impact of reflectors and propagation disturbance on localization.

One other concept that may be worth mentioning is the ability to determine orientation. Because of the digital nature of these techniques, position determination is rather invariant to orientation since the determination is binary—does sensor 122 see X frequency or not? However, with more than one proximate sensor 122 on the object of interest, in some example approaches, system 100 determines orientation based on the relative position of the sensors.

What is discussed above is a light-based 3D indoor localization design that models the refracting path of light rays and makes binary decisions on the reception of frequency modulated signals. System 100 is highly robust and accurate because it does not assume an in-situ signal strength attenuation model or rely on absolute signal strength. It achieves centimeter level accuracy even on a low refresh rate projector implementation. System 100 has demonstrated in various test environments that it is robust to various environmental and operational effects, indicating the potential that digital localization can offer. The addition of rapidly-switching LED array panels to system 100 will improve localization granularity even further.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

The invention claimed is:

1. A lamp, comprising:
   a plurality of light emitting diodes (LEDs) arranged as an array of LEDs;
   a convex lens; and
   a modulation distribution network, wherein the modulation distribution network modulates light emitted by each LED with a modulation signal selected from a set of modulation signals to form digital light signals associated with each respective LED,
   wherein the convex lens is positioned to create a mapping between locations in a space illuminated by the lamp and the LEDs lighting each respective location such that the digital light signals received by a receiver as the receiver moves to each respective location within the space can be used to determine the location of the receiver within the space.

2. The lamp of claim 1, wherein the modulation distribution network modulates the light emitted by each LED using frequency shift keying (FSK) modulation.

3. The lamp of claim 1, wherein the lamp includes N LEDs and wherein the lamp reuses the modulation signals, in a random manner, such that less than N modulation signals are used to modulate the LEDs.

4. The lamp of claim 1, wherein the lamp includes N LEDs and wherein the lamp reuses the modulation signals, in a random manner, such that N/K modulation signals are used to modulate the LEDs, wherein K and N/K are integers.

5. A localization system, comprising:
a plurality of receivers; and
an LED lamp, wherein the LED lamp includes:
   a plurality of light emitting diodes (LEDs) arranged as an array of LEDs;
   a convex lens; and
   a modulation distribution network, wherein the modulation distribution network modulates light emitted by each LED with a modulation signal selected from a set of modulation signals to form digital light signals associated with each respective LED, wherein the receivers are placed at locations illuminated by the lamp, and
wherein the convex lens is positioned to create a mapping between the locations illuminated by the lamp and the LEDs lighting each respective location, the digital light signals received by each receiver used to determine the location of the respective receiver relative to the lamp as a function of the LEDs sensed by the respective receiver as the respective receiver moves between the locations illuminated by the lamp.

6. The system of claim 5, wherein the modulation distribution network modulates the light emitted by each LED using frequency shift keying (FSK) modulation.

7. The system of claim 5, wherein each receiver includes one or more sensors used to capture signal information associated with the digital light signals received by the respective receiver,
wherein the system further comprises a localization processor, wherein the localization processor receives the signal information captured by each sensor and determines the location of each receiver as a function of the captured signal information.

8. The system of claim 5, wherein each receiver includes one or more sensors used to capture signal information associated with the digital light signals received by the respective receiver,
wherein the system further comprises a localization processor, wherein the localization processor receives the signal information captured by each sensor and determines the location of each receiver as a function of the modulation signal used to modulate each LED.

9. The system of claim 5, wherein the LED lamp further comprises a localization system, wherein the localization system receives information on waveforms received by two or more of the plurality of receivers and determines the location of the two or more receivers as a function of the information.

10. A lamp, comprising:
a plurality of light emitting diodes (LEDs) arranged as an array of LEDs;
a convex lens; and
a modulation distribution network, wherein the modulation distribution network modulates light emitted by each LED with a modulation signal selected from a set of modulation signals to form digital light signals associated with each respective LED, wherein the modulation distribution network selects a blinking frequency $F_i$ for each LED in the lamp and modulates each LED using the selected blinking frequency, wherein the blinking frequency $F_i$ is selected from a set of frequencies used to modulate the LEDs,
wherein the convex lens is positioned to create a mapping between locations illuminated by the lamp and the LEDs lighting each respective location such that the digital light signals received at each respective location can be used to identify the respective location.

11. The lamp of claim 10, wherein the lamp includes N LEDs and wherein the modulation distribution network randomly reuses the blinking frequencies $F_i$ selected from the set of frequencies used to modulate the LEDs such that less than N blinking frequencies are used to modulate the LEDs.

12. The lamp of claim 10, wherein the modulation distribution network modulates the light emitted by each LED using frequency shift keying (FSK) modulation such that the digital light signals received at each respective location are modulated at a different frequency.

13. The lamp of claim 12, wherein the modulation distribution network further modulates the light emitted by each LED to maintain a desired light intensity for the lamp.

14. The lamp of claim 1, wherein the modulation distribution network further modulates the light emitted by each LED to maintain a desired light intensity for the lamp.

15. The system of claim 5, wherein the modulation distribution network selects a blinking frequency $F_i$ for each LED in the lamp and modulates each LED using the selected blinking frequency, wherein the blinking frequency $F_i$ is selected from a set of frequencies used to modulate the LEDs.

16. The system of claim 15, wherein each receiver includes one or more sensors used to capture signal information associated with the digital light signals received at the receiver, and
wherein the system further comprises a localization processor, wherein the localization processor receives the signal information captured by each sensor and determines the location of each receiver as a function of the frequency used to modulate each LED.

17. The system of claim 15, wherein the modulation distribution network reuses the blinking frequencies $F_i$ selected from the set of frequencies used to modulate the LEDs in a random manner such that less than N blinking frequencies are used to modulate the LEDs.

18. A localization system, comprising:
a plurality of receivers; and
an LED lamp, wherein the LED lamp includes:
   a plurality of light emitting diodes (LEDs) arranged as an array of LEDs;
   a convex lens; and
   a modulation distribution network, wherein the modulation distribution network modulates light emitted by each LED with a modulation signal selected from a set of modulation signals to form digital light signals associated with each respective LED, wherein the modulation distribution network modulates the light emitted by each LED using frequency shift keying (FSK) modulation such that the digital light signals received at each respective location are modulated at one or more different frequencies,
wherein the receivers are placed at locations illuminated by the lamp, and
wherein the convex lens is positioned to create a mapping between the locations illuminated by the lamp and the LEDs lighting each respective location, the digital light signals received by each receiver used to determine the location of the respective receiver as a function of the LEDs sensed by the receiver.

19. The system of claim 18, wherein each receiver includes one or more sensors used to capture signal information associated with the digital light signals received by the respective receiver, and
 wherein the system further comprises a localization processor, wherein the localization processor receives the signal information captured by each sensor and determines the location of each receiver as a function of the frequency used to modulate each respective LED.

* * * * *